INVENTORS
E. K. CLARDY
R. W. MICHAEL
BY Young & Quigg
ATTORNEYS

INVENTORS
E. K. CLARDY
R. W. MICHAEL
BY
*Young & Quigg*
ATTORNEYS

United States Patent Office 3,348,032
Patented Oct. 17, 1967

3,348,032
DIGITAL COMPUTER SET POINT
CONTROL SYSTEM
Edwin K. Clardy and Richard W. Michael, Bartlesville, Okla., assignors to Phillips Petroleum Company, a corporation of Delaware
Filed July 11, 1963, Ser. No. 294,275
6 Claims. (Cl. 235—151.1)

ABSTRACT OF THE DISCLOSURE

A digital-to-analog system uses the electrical output of a digit computer to adjust a controller set point by actuating a motor and controlling the direction of rotation of the motor, with a preset timer being interposed between the computer and the motor to limit the amount of adjustment during each computer cycle.

This invention relates to a method of and apparatus for utilizing digital computer output signals to manipulate the set points of process variable controllers.

When a digital computer is employed to control a process, process data must be supplied in a form compatible with the digital computer input requirements. Process data obtained in analog form is scanned, zero-suppressed, amplified, converted to digital form and sequenced into the computer input register. The equipment employed to perform these functions is referred to as a digital computer data collection system.

Various types of digital computers are well known and are commercially available. This application is concerned with the output signals transmitted from a digital computer only and the discussion hereinafter, as pertains to the operation of a digital computer, will be limited thereto. The computer construction, the circuits involved, and the phenomena of operation are described in British Patent 749,836, published June 6, 1956, to Remington-Rand, Inc., on what is known as the "Univac." Various other types of circuits suitable for use in digital computers, and the manner in which they operate, are set forth in Millman et al., "Pulse and Digital Circuits," (Chapter 13), McGraw-Hill, New York (1965). Other circuits which may be employed in the digital computations are described in Engineering Research Associates, "High Speed Computing Devices," McGraw-Hill, New York (1950), particularly in Chapter 13 thereof.

When a digital computer is employed to control a process, it is desirable in order to effectuate the control to utilize the electrical signals transmitted by the digital computer to adjust conventional process controllers. Therefore, it is desirable that a means should be provided for translating the electrical output signals from the digital computer into suitable set point signals.

Accordingly, an object of our invention is to provide a method of and apparatus for translating the electrical output signals of a digital computer into appropriate control signals.

Another object of our invention is to provide an improved digital computer set point control system.

Other objects, advantages and features of our invention are readily apparent from the following disclosure and the appended claims.

We have discovered a method of and apparatus for translating the electrical output signals of a digital computer into appropriate control signals which are proportional to computer computation and for employing the said appropriate control signals to manipulate the set points of process controllers.

Figure 1:
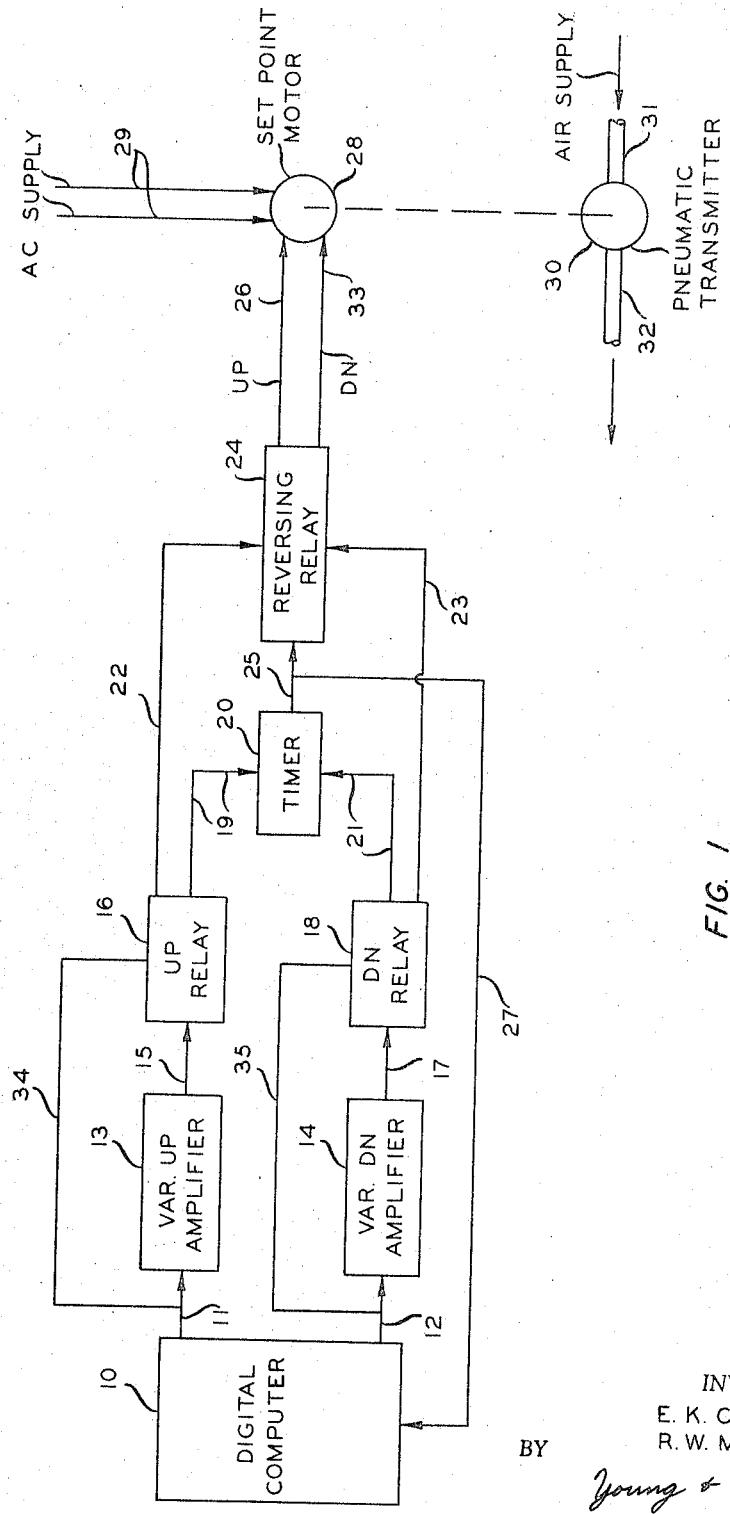
FIGURE 1 is a schematic representation of the digital computer and set point control system.
Figure 2:
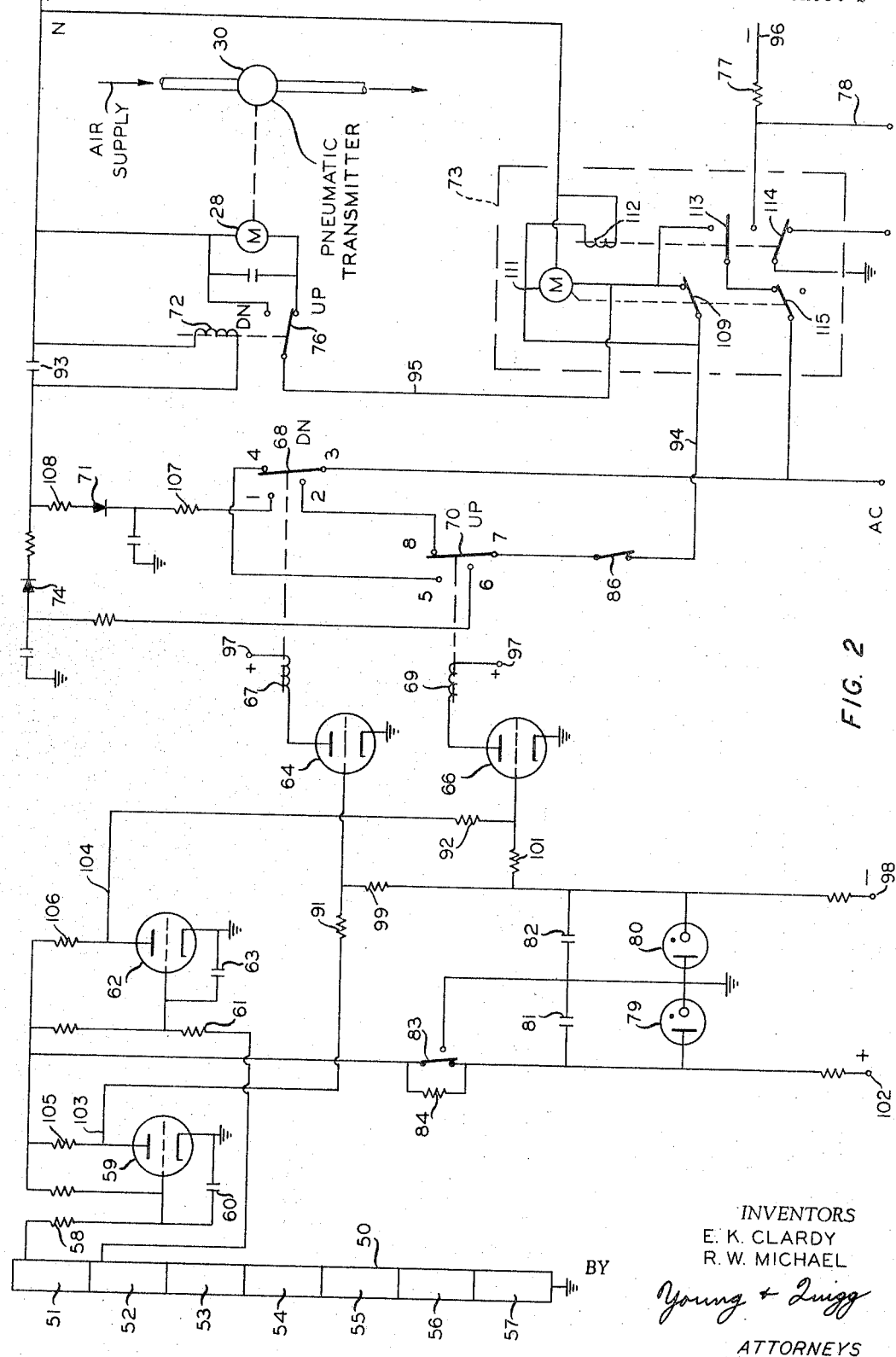
FIGURE 2 illustrates the circuit details of one embodiment of the invention wherein the electrical output signals from the digital computer are translated into suitable set point signals of a pneumatic nature.

Referring to FIGURE 1, there is illustrated apparatus capable of performing the operations of a digital computer set point control system wherein electrical signals are transmitted from the digital computer and translated into pneumatic signals suitable for adjusting pneumatic motor valves or other process control equipment. Generally the control system is employed to adjust the set points of conventional pneumatic process controllers which in turn manipulate conventional motor valves in the usual fashion. The digital computer set point control system, although not necessarily limited thereto, will be described as it is employed to manipulate the set points of conventional pneumatic controllers. Therefore, the apparatus of FIGURES 1 and 2 is directed to a means of translating the electrical output signals from a digital computer into suitable set point signals of a pneumatic nature. If it is desired to employ electrical controllers and electrical motor valves, the apparatus of FIGURES 1 and 2 would have the equivalent electrical translating mechanism and appropriate transmission means would be provided to operate therewith in effecting the resetting of the various process controllers.

The apparatus of FIGURES 1 and 2 receives a pair of signals from display devices, such as a pair of nixie tubes in the digital computer 10. The combination of these signals tells an associated drive motor which direction to run. During the time that the drive motor operates, it manipulates a pneumatic flapper valve in a particular direction. For example, if it is desired to raise the set point of a process controller, the signal is transmitted from the nixie tube within digital computer 10 via lead means 11 to a variable amplifier 13. Responsive to a signal received by amplifier 13, a signal is transmitted to relay 16 via lead means 15 and from relay 16 to timer 20 via lead means 19 and to reversing relay 24 via lead means 22. A signal transmitted to timer 20 actuates timer 20 for a predetermined period of time as determined by a manually operated set point.

It is within the scope of this invention to bypass amplifier 13 and pass the signal directly from digital computer 10 to relay 16 via leads 11 and 34 in the event that signal transmitted by digital computer 10 is of sufficient strength to actuate relay 16.

The signal transmitted to reversing relay 24 via lead means 22 so positions relay 24 that upon receiving a signal via lead means 25 from timer 20, a signal is transmitted from reversing relay 24 via lead means 26 to set point motor 28. Set point motor 28 upon receiving a signal from reversing relay 24 via lead means 26, repositions pneumatic transmitter 30 so as to adjust the flow of air through conduit means 31 to produce the desired pneumatic pressure in conduit 32 thereby raising the set point of the process controller of which pneumatic transmitter 30 is an integral part.

In addition to the signal transmitted from timer 20 via lead means 25 to reversing relay 24, a signal is also transmitted from timer 20 via lead means 27 to the digital computer 10 indicating that a signal has started to be transmitted from timer 20 to reversing relay 24. The signal transmitted to digital computer 10 via lead means 27 is discontinued at the time the signal transmission from timer 20 to reversing relay 24 is discontinued, thereby indicating to digital computer 10 that the signal transmission from timer 20 to reversing relay 24 has ceased. The repositioning of pneumatic transmitter 30 by set point motor 28 occurs only as a signal is being received by set point motor 28 via lead means 26. Therefore, the magnitude of the adjustment or manipulation of pneumatic transmitter 30 is determined by the set point of timer 20. Thus, an advantage of the inventive digital computer set point control system is that defective apparatus in the control system will not result in the set point motor 28 driving the pneumatic transmitter 30 completely in one direction, a danger continually present in conventional digital computer control systems.

With the signal transmitted from digital computer 10 via lead means 12 indicating that the set point should be lowered, operation of the inventive digital computer control system is identical with the exception that reversing relay 24 is so positioned responsive to a signal received from relay 18 via lead means 23 that the signal transmitted from timer 20 via lead means 25 is passed from reversing relay 24 to set point motor 28 via lead means 33. Timer 20 transmits a signal to reversing relay 24 responsive to a signal received from relay 18 via lead means 21. The signal received by set point motor 28 via lead means 33 causes set point motor 28 to be driven in the reverse direction, thereby reversing the direction of movement of the valve within pneumatic transmitter 30. As previously noted, with digital computer 10 transmitting a strong signal, amplifier 14 can be bypassed and the output signal passed directly via lead means 12 and 35 to relay 18.

Referring to FIGURE 2, a preferred embodiment of the invention is illustrated. The signals appearing at the output of the digital computer 10 are applied by their appropriate cables to the terminals in terminal block 50. These terminals are arranged in pairs and have respective switching circuits or the equivalent connected thereto in order to command appropriate ones of set point motors to operate. The pairs of terminals are: 51, 52; 53, 54; 55, 56. Thus it can be seen that there are three pairs of terminals which can respectively cooperate with each of three process controllers. For purposes of simplification, the discussion of the invention will hereinafter be limited to the control of a single set point motor through terminals 51 and 52.

A resistor 58 is connected between terminal 51 and the control grid of a triode 59. A negative voltage is transmitted from terminal 51 to the control grid of triode 59 when it is desired to lower the set point of the process controller. A condenser 60 is connected between the control grid of triode 59 and ground functioning as a bypass filter to prevent transmission of stray pulses or transient voltages to the control grid of triode 59.

A resistor 61 is connected between the control grid of triode 62 and terminal 52. A negative voltage is transmitted from terminal 52 through resistor 61 to the control grid of triode 62 when it is desired to raise the set point of the process controller. A condenser 63 is connected between the lead to the control grid of triode 62 and ground to prevent the transmission of stray pulses or transient voltages to the control grid of triode 62.

A resistor coupling 91 is connected between the anode of triode 59 and the control grid of triode 64. A resistor coupling 92 also connects the anode of triode 62 with the control grid of triode 66.

The anode of triode 64 is connected to a motor selection relay 67 and activates motor selection relay 67 positioning switch 68 in the down position (3, 2, 1). A similar construction connects the anode of triode 66 with a motor selection relay 69 to position switch 70 in the up position (7, 6, 5) upon receipt of a signal by triode 66. As previously indicated, with digital computer 10 transmitting a strong signal, the signal would be applied directly to relay 67 or 69.

Terminal 1 of switch 68 is connected through a diode 71 to a motor selection relay 72 shunted by condenser 93, and to lead N, the first lead of an alternating current supply source connected to leads AC and N. Terminal 2 of switch 68 is connected to terminal 8 of switch 70 and through switches 70 and 86 to a conventional timer 73 such as the Cycl-Flex timer, Model HP–2, manufactured by Eagle Signal Company of Moline, Ill., and illustrated in Bulletin 120. This timer has been modified slightly as illustrated in the drawing to provide for failsafe operation if power is maintained through switch 86 from relay switches 70 and 68. Terminal 4 of switch 68 is connected to terminal 5 of switch 70. Terminal 6 of switch 70 is connected through diode 74 to relay coil 72 and to lead N. Relay coil 72 is operably connected to switch 76, positioning switch 76 responsive to signals received from diodes 71 and 74. The contactor 3 of switch 68 is connected to the second lead of the AC circuit mentioned above. Lead N is also connected to the motor of timer 73.

A lead 94 connects switch 70 and timer 73. Timer 73 has a manually manipulatable set point. A lead 95 connects timer 73 with switch 76. A negative voltage power supply 96 is connected through resistor 77 to timer 73 and to digital computer 10 via lead 78.

Motor 28 is connected by two leads to switch 76, and by a conventional mechanical linkage to a pneumatic transmitter 30. Transmitter 30 is connected between an air supply and a controller not herein illustrated. Details of a suitable pneumatic transmitter may be found in the Tayor Instrument Company Bulletin 490JF Transcope Recorder.

A positive power supply 97 is connected through the respective solenoids of motor selection relays 67 and 69 to the anodes of triodes 64 and 66. A negative power supply 98 is connected through appropriate grid resistors 99 and 101 to the control grids of triodes 64 and 66. Thus a negative bias is applied to the grids of 64 and 66 to maintain them in a non-conducting state until a positive signal is applied over leads 103 and 104 connected to the anodes of 59 and 62, respectively. A positive power supply 102 is connected through appropriate size resistors 105 and 106 to the anodes of amplifier triodes 59 and 62. Voltage regulation of the positive power supply to triodes 59 and 62 and the negative power supply to driver triodes 64 and 66 is provided by two gas-filled voltage regulator tubes 79 and 80 which are connected between the positive and negative power supplies and ground. Connected in parallel with each of the voltage regulator or stabilizer tubes are capacitors 81 and 82, respectively. An alternating current power supply is connected to switch 68, timer 73 and set point motor 28.

Operation of the inventive digital computer set point control system will now be described as it is at first applied when the said digital computer transmits a signal indicating that the set point of the controller should be lowered. A negative voltage is applied from terminal 51 through resistor 58 to the control grid of triode 59, cutting off triode 59. A positive voltage is then applied to the control grid of triode 64. When the control grid of triode 59 receives a negative voltage signal, a positive voltage is then transmitted to the control grid of triode 64, thereby activating triode 64.

Relay 67 repositions switch 68 so that contactor 3 connects one of the AC leads to contacts 1 and 2. Contact 1 is connected through resistor 107, rectifier 71, resistor 108, and relay 72, to lead N. Filtered negative pulses resulting from the rectification taking place in rectifier 71 operate relay 72, moving switch 76 to the down position which causes set point motor 28 to rotate in a direction to lower the set point. Contactor 3 in his position connects alternating current through contact 2, switch 70, manual switch 86, to switch 109 in timer 73 and through its timer motor 111 to lead N. The timer motor 111 is latched in the AC circuit by an electrically engaged toothed clutch and relay 112 actuating switch 113 which also operate another switch 114 grounding a negative voltage supply through resistance 77, thus removing the negative signal from lead 78 connected to computer 10. When timer 73 "times out" its motor 111 unlatches its latching clutch and relay 112 by momentarily opening switches 109 and 115, removing alternating current from the lead 95 to switch 76, and disconnecting the grounded negative in the timer, supplying a negative signal to the computer over lead 78 to tell the computer that a set point change has been completed.

Upon receiving a negative voltage from diode 71, relay coil 72 positions switch 76 in the down position. Upon receiving an AC signal from switch 70, timer 73 transmits a voltage to set point motor 28 through switch 76 for the period of time determined by the set point setting of timer 73. Upon receiving a voltage signal from switch 70, timer 73 ceases to transmit a negative voltage signal through resistor 77 and lead 78 to digital computer 10, thereby indicating to digital computer 10 that a set point change is being made. When the transmission of a voltage from timer 73 to set point motor 28 is halted, the transmission of a negative voltage through resistor 77 and lead 78 to digital computer 10 is resumed, indicating that the set point adjustment or manipulation has been completed.

Set point motor 28 manipulates a valve within pneumatic transmitter 28 as long as an alternating current voltage is being received through switch 76 with the direction of adjustment of the valve of pneumatic transmitter 30 determined by the positioning of switch 76. When switch 76 is in the down position, the valve of pneumatic transmitter 30 is manipulated so as to lower the set point of the process controller.

When a negative voltage is transmitted from digital computer 10 indicating that the set point of the process controller should be raised, the said negative voltage is transmitted to the control grid of triode 62. A positive voltage is then applied to the control grid of triode 66. The positive voltage normally directed to the anode of triode 62 is transmitted to the control grid of triode 66.

Relay 69 is activated thereby repositioning switch 70 so that point 7 contacts 5 and 6 enabling alternating current potential to pass through switch 68, contacts 5, 6 and 7 and switch 86 to the motor of timer 73 and to lead N. Contact 6 transmits alternating current potential to rectifier 74 with the rectified positive voltage resulting being applied through relay 72 to lead N. Relay 72 moves switch 76 to the up position as shown, thereby causing set point motor 28 to rotate in the direction to raise the set point.

The alternating current voltage drives timer 73 as previously described.

Upon receiving a positive voltage from diode 74, relay 72 positions switch 76 in the up position. Timer 73 upon receiving an AC signal from switch 70 allows an AC potential to flow through switch 76 to set point motor 28 for a period of time as determined by the time setting of timer 73. As previously noted with respect to the transmittal of a signal to lower the set point, timer 73 ceases to transmit a negative voltage signal through resistor 77 and lead 78 to digital computer 10 while alternating current is applied to switch 76, thereby indicating to digital computer 10 that a set point change is being made. When the transmission of a voltage from timer 73 to set point motor 28 is halted, the transmission of a negative voltage through resistor 77 and lead 78 to digital computer 10 is resumed, indicating that the set point adjustment or manipulation has been completed.

Switch 86 provides a means of isolating timer 73 from the remainder of the set point control system if desired. Switch 83 and resistor 84 provide a means of grounding the positive voltage normally transmitted to the anodes of triodes 59 and 62. Triodes 59 and 62 are thus made inactive. Resistor 84 permits a normal load on tubes 79 and 80. This arrangement permits instant use of the controller when it is desired and without sacrificing the lockout feature when it is needed.

The circuitry of FIGURE 2 is repeated for each controller for which it is desired to manipulate the set point responsive to a digital computer output signal. Thus each set point is manipulated individually.

By operating relays 67 and 69 having switches 68 and 70, respectively, in the previously described manner, ambiguous or stray digital computer signals are prevented from exercising control of the set points of the individual controllers. By both relays being energized, an open circuit to timer 73 is maintained, preventing false signals from manipulating the set point of the controller.

An advantage of the inventive set point control system is that digital computer 10 is committed to control only until a signal is received through lead 78 indicating that the set point manipulation has started (as previouosly indicated this consists of the interruption of a negative voltage signal). The balance of the time during which the set point is being manipulated can be employed by the digital computer in other operations. For example, the digital computer can be employed to set in motion the manipulation of other set point control systems.

Additional advantages of the inventive set point control system are its failsafe features. In case of a filament in triodes 59 or 62 burning out, relays 67 and 69 are energized. As the filaments of triodes 59 and 62 are in series, relays 67 and 69 are energized as if triodes 59 and 62 simultaneously received signals from digital computer 10. If relays 67 and 69 are simultaneously energized, timer 73 cannot be set as the alternating current circuit will be broken through switches 68 and 70. Even if timer 73 were set, set point motor 28 would manipulate the pneumatic transmitter 30 valve only one step. The operation of pneumatic transmitter 30 could not be further controlled until the burned-out tube was replaced. If the filament in triodes 64 or 66 burns out, timer 73 cannot be set into operation. The switch arrangement in timer 73 will permit power to be directed to motor relay 76 only until timer 73 times out. This will occur even if timer 73 continues to receive a maintain signal. The signal must be removed to permit timer 73 to reset and start a new timing cycle. Lead 78 will carry an end timing signal until the timer is reset.

As will be evident to those skilled in the art, various modifications of this invention can be made, or followed, in the light of the foregoing disclosure and discussion without departing from the spirit or scope thereof.

What is claimed is:

1. Apparatus comprising, in combination, a motor means, means for producing a first discrete signal when it is desired to cause said motor means to move in a first direction and for producing a second discrete signal when it is desired to cause said motor means to move in the direction opposite said first direction, reversing means associated with said motor means to connect said motor means to move in said first direction upon the occurrence of said first signal and to connect said motor means to move in said opposite direction upon the occurrence of said second signal, a source of power, timing means for connecting said motor means to said source of power for a predetermined period of time upon the occurrence of one of said first and second signals to thus limit the degree of movement of said motor means for each occurrence of one of said first signal and said second signal, and means for applying said first and second signals from said means for producing to said reversing means and said timing means.

2. Apparatus in accordance with claim 1 wherein said means for producing is a digital computing means, and further comprising means for transmitting a signal from said timing means to said digital computing means indicating that said motor means is being moved.

3. Apparatus in accordance with claim 1 further comprising valve means operably connected to and manipulated by said motor means.

4. Apparatus in accordance with claim 3 further comprising a process controller having a setpoint, and means connecting said valve means to said controller to vary said setpoint responsive to the movement of said motor means.

5. Apparatus in accordance with claim 1 wherein said means for producing is a digital computing means, and wherein said means for applying comprises a first relay means having a first switch operatively associated therewith, a second relay means having a second switch operatively associated therewith, means for applying said first signal from said digital computing means to said first relay means to actuate said first switch upon an occurrence of said first signal, means for applying said second signal from said digital computing means to said second relay means to actuate said second switch upon an occurrence of said second signal, said first and second switches being connected between said source of power and said timing means to actuate said timing means when only one of said first and second switches is actuated.

6. An apparatus in accordance with claim 5 wherein said reversing means comprises a reversing relay having first and second positions, said reversing relay in said first position connecting said motor means to rotate in said first direction and in said second position connecting said motor means to rotate in said opposite direction, means for actuating said reversing relay to said first position responsive to the actuation of said first switch, and means for actuating said reversing relay to said second position responsive to the actuation of said second switch.

References Cited

UNITED STATES PATENTS

| | | | |
|---|---|---|---|
| 2,753,503 | 7/1956 | Wideroe | 235—150.1 X |
| 3,034,718 | 5/1962 | Freitas et al. | 235—151.1 |
| 3,044,701 | 7/1962 | Kerstukos et al. | 235—151 |
| 3,045,911 | 7/1962 | Russell et al. | 235—151 |
| 3,081,942 | 3/1963 | Maclay | 235—150.5 X |
| 3,086,708 | 4/1963 | Berkowitz et al. | 235—151.1 X |
| 3,172,026 | 3/1965 | Schuman. | |
| 3,190,301 | 6/1965 | Hackman | 235—150.1 X |

MALCOLM A. MORRISON, *Primary Examiner.*

I. KESCHNER, M. P. HARTMAN, *Assistant Examiners.*